L. D. McINTOSH.
GALVANIC BELT.

No. 249,070. Patented Nov. 1, 1881.

Witnesses:

Inventor:
Lyman D. McIntosh

UNITED STATES PATENT OFFICE.

LYMAN D. McINTOSH, OF CHICAGO, ILLINOIS.

GALVANIC BELT.

SPECIFICATION forming part of Letters Patent No. 249,070, dated November 1, 1881.

Application filed May 16, 1879.

*To all whom it may concern:*

Be it known that I, LYMAN D. MCINTOSH, of the city of Chicago, Cook county, State of Illinois, have invented new and useful Improvements in Galvanic Belts, of which the following is a full description, reference being had to the accompanying drawings, in which—

Figure 1:
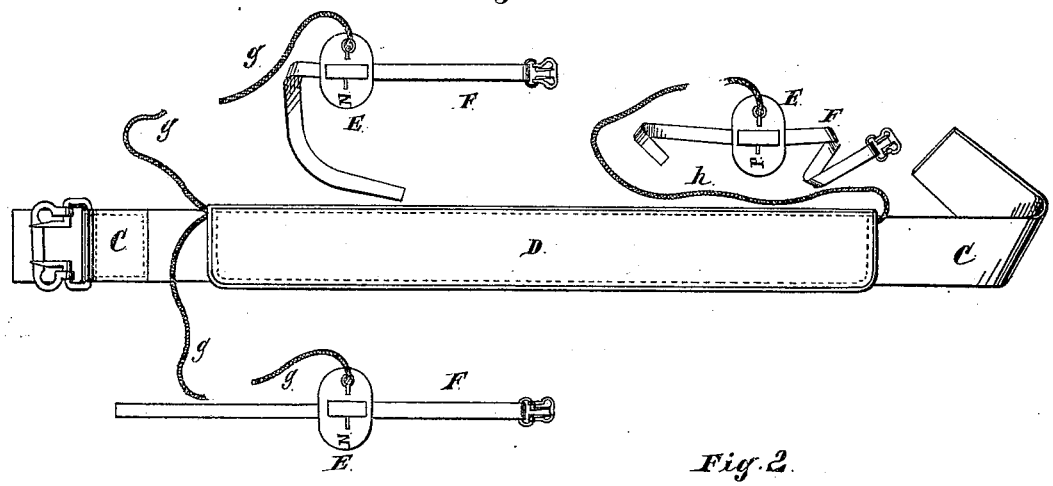
Figure 2:
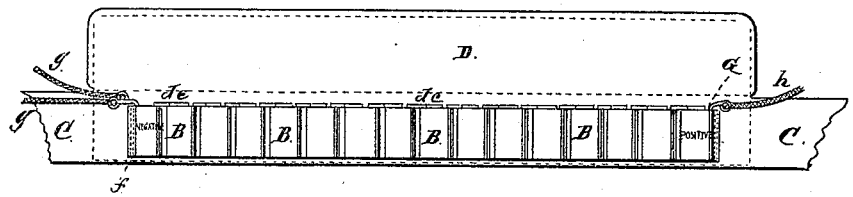
Figure 3:
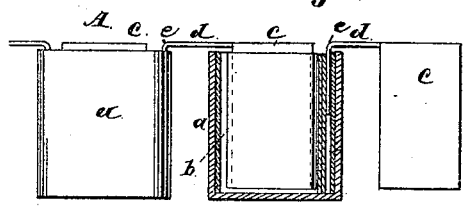
Figure 4:
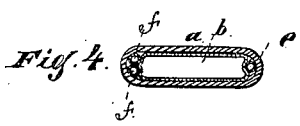

Figure 1 is a side elevation showing the complete belt; Fig. 2, a side elevation with the electrodes and ends of the belt removed and the flap or cover raised; Figs. 3 and 4, enlarged details of the battery cells or cups.

The object of this invention is to so construct an electric or galvanic belt as to generate an electric current which can be varied in its intensity for the purpose of producing varying degrees of galvanization upon the body of the person wearing the belt to which the current-producing battery is attached.

In the drawings, A represents the battery-cells; B, the receiving-pockets; C, the backing material; D, the flap or cover; E, the electrodes; F, the straps for attaching the electrodes in position; G, the current-selector; *a*, the outer casing of insulating material; *b*, the lining, constituting one plate of the battery; *c*, the other plate of the battery; *d*, the connecting-wires; *e*, the tube or opening for the connecting-wires; *f*, the tubes or opening for the electrode cords or wires at one end of the circuit; *g h*, the cords or wires connecting the electrodes with the battery.

The cells or cups A are made with an outer casing of hard rubber and a lining of some metal used in a battery as one of the plates. These cells may be rectangular or other shape, so formed as to leave an interior space in which to place the other plate of the battery and the battery-solution.

The insulating material *a* is hard rubber, and the lining *b* is copper, which metal constitutes the negative plate of the battery, and these cells are formed by placing the rubber around the copper lining in a plastic condition and then vulcanizing it, or treating it in any other suitable manner, so as to produce a close union or cementing of the rubber and plate and provide a cup or cell with an interior space the sides of which are lined with copper, in which space is placed a plate, *c*, of zinc, which metal constitutes the positive plate of the battery. The plates *c* are of a sufficient size and thickness so that when in position in the cups or cells there will be a space between them and the walls of the lining *b*, which space is to be nearly filled by a porous substance wound around the plate *c*, which substance will absorb the battery-solution contained in such space.

The connection between the positive and negative plates is made by wires *d*, which wires are soldered or attached at one end to plates *c*, and the other end extends over the edge of the next cup or cell and enters a copper tube or opening, *e*, located between the lining *b* and the casing *a*, as shown at Fig. 3. A wire, *d*, is provided for each plate *c*. This form of connection makes the belt pliable, so that it can be placed around the body of the wearer.

Each cell or cup is located in a pocket, B, of a size sufficient to receive it, stitched or otherwise fastened to a backing, C. These pockets B may be made of rubber or other material, and the backing C may be cloth or other woven fabric, and this backing is longer than the pockets, and one end is provided with a buckle, by means of which the belt is attached to the body.

As shown, a flap or cover, D, is attached to the backing C, so as to be turned down over the cells or battery, for the purpose of covering them and keeping out dirt and dust to some extent.

As shown, two negative and one positive electrode are used. The negative electrodes are connected with the negative pole of the battery by cords or wires *g*, suitably attached at one end to the electrode, and having the other end inserted in a copper tube or opening, *f*, located between the lining *b* and the casing *a* of the cup or cell at the negative end of the circuit. The positive electrode is connected with the positive pole of the battery by a cord or wire, *h*, one end of which is suitably attached to the electrode and the other to a wire or strip of conducting material, G, which can be placed in contact with the positive plate of the battery. This strip G can be placed in contact with the plate *c* in any one of the cells or cups A, and its position relative to the terminal cells or cups of the battery will determine the strength of the current generated, the strongest current being when the connection is with the terminal cell or cell farthest from the opposite pole of the battery, and the weakest when connected with the zinc plate in the cell or cup at the negative pole of the battery. By using this strip G the entire number of cups or cells can be placed in the circuit, or any number of the cells from one up can be used, according as a weak or strong current is desired.

The electrodes E may be of any of the well-known forms and construction for such devices, and the straps or tapes F, by means of which they are held in place, are attached to the electrodes, as usual, and the ordinary straps or tapes used for such purpose. The number of cups or cells A provided will depend upon the length of circuit, and the longer the circuit the stronger will be the current generated.

The cells or cups are placed in the pockets B, and the proper connection made with the positive and negative plates of each cell by the wires $d$, as before described. A few drops of the battery-solution is then poured in each cup or cell, when the belt is ready for use.

In use the belt is attached to the body by the strap or backing C, and the current generated by the battery is conveyed to any part of the body, to which it is to be applied by the electrodes E in the usual manner.

In charging the belt the power of the current can be varied by diluting the battery-solution, and the belt should be charged commencing at the positive end and ending with the negative, and in use if a strong current is desired, the circuit should include all the cells or cups; if a weak current, a less number of cells or cups should be included in the circuit.

To clean the battery, remove the zinc plates, take off the cloth which surrounds each of them, wash the zinc and cell, scrape the zinc, put a clean piece of cloth or porous substance around the zinc plate, and replace it in the cell.

The outer casing, $a$, prevents the current generated from passing otherwise than through the conducting-wires. This belt is a complete galvanic battery.

What I claim as new, and desire to secure by Letters Patent, is—

1. An electric belt provided with an attached battery cell or cup constructed of the exterior hard-rubber casing, $a$, formed integral with a bottom, and an interior lining covering the vertical inner surface only of the casing and forming one of the plates of a battery, the said lining being united directly to and in contact with the hard-rubber casing, in the manner and for the purposes described.

2. The casing $a$ and lining $b$, forming the cell or cup of a battery, and tube or opening $e$, in combination with the plate $c$ and wire $d$, for connecting the battery-plates together and forming a hinged connection between the cells or cups, substantially as and for the purposes specified.

3. A galvanic belt consisting of the backing C, pockets B, cells or cups A, having an outer casing, $a$, and lining $b$, plates $c$, wires $d$, forming a battery, and having electrodes E connected with such battery, all constructed and arranged substantially as specified.

LYMAN D. McINTOSH.

Witnesses:
O. W. BOND,
F. F. BRUNS.